United States Patent Office 2,947,666
Patented Aug. 2, 1960

2,947,666

AMINO ACIDS AND PROCESS

Hsing T. Huang, Fresh Meadows, N.Y., assignor to Chas. Pfizer & Co., Inc., New York, N.Y., a corporation of Delaware No Drawing. Filed Sept. 30, 1957, Ser. No. 686,880

2 Claims. (Cl. 195—47)

This invention is concerned with a novel process for the preparation of the amino acids, diaminopimelic acid and glutamic acid. More particularly, it is concerned with the production of diaminopimelic acid and glutamic acid by fermentation methods suitable for large scale commercial use.

It has now been found that it is possible to prepare both diaminopimelic acid and glutamic acid in high yields by a fermentation process employing a single organism as inoculum. The present invention is the first time that diaminopimelic acid and glutamic acid have been prepared from simple carbon sources in a fermentation process. Diaminopimelic acid may be converted to lysine by the method of Casida, U.S. Patent, 2,771,396. Lysine is a well-known important essential amino acid; glutamic acid, in the form of the sodium salt, is widely used to impart meat flavor to foods and also to enhance other natural food flavors. The present invention provides an economical means of producing the important compounds diaminopimelic acid and glutamic acid.

The organism of this invention is a mutant of *E. coli* which initially, i.e. at the beginning of fermentation, lacks the enzyme diaminopimelic acid decarboxylase and is unable to grow without the presence of lysine in the nutrient medium. As described by Casida (op. cit.), mutant strains of *E. coli* are known to accumulate diaminopimelic acid. The mutant organism of this invention is unique in accumulating glutamic acid as well as diaminopimelic acid. Of the numerous mutant strains of *E. coli* tested, this strain of *E. coli* is found to be the only organism to produce this effect. Such a mutant organism may be produced by methods well known to the art, such as ultraviolet radiation. A growing culture of the mutant strain of *E. coli* which has been found to carry out the reaction of this invention in good yield has been deposited with the American Type Culture Collection in Washington, D.C., and added to their permanent collection where it has been give the number ATCC 12,932. In the fermentation medium, the organism cells grow as tiny cocci spherical in shape in contrast to normal wild strains and mutant strains of *E. coli* which grow as straight short rods.

In carrying out the process of this invention a nutrient medium is inoculated with this mutant strain of *E. coli* which requires lysine for its growth. This nutrient medium may vary considerably in composition. It should contain a source of carbohydrates, for example, molasses or glycerine, sources of nitrogen such as ammonium hydrogen phosphate and ammonium sulfate and some lysine. The presence of glycerine in the reaction medium is extremely helpful. In general, from about 1% to 8% of glycerine is employed. The initial concentration of lysine in the original fermentation broth is of critical importance. The concentration should be within the limitations of about 0.1 to 0.5 gram per liter. In general, the very best results are obtained when the lysine concentration is between 0.2 and 0.4 gram per liter.

The fermentation is usually conducted at a temperature of about 28° C., although this temperature may be varied somewhat from about 25° to 40° C., for a period of from 30 to 60 hours after the broth has been incubated with the organism. Fermentation is conducted under submerged, aerobic conditions. Efficient aeration is essential to the fermentation process. For this purpose, vigorous agitation is employed to ensure thorough distribution of the air throughout the fermentation medium. For example, aeration is carried out at a rate of from about one-half to about two volumes of air per volume of reaction mixture per minute. Stirring at a rate of about 1750 revolutions/minute is found effective. At the end of this time, the fermentation broth is rich in diaminopimelic acid and glutamic acid. Periodically, samples of the reaction mixture are assayed for amino acid concentration. This procedure may be employed to follow the course of the reaction.

The diaminopimelic acid and glutamic acid may then be obtained from the fermentation medium by methods well known in the art. For example, after filtering off the solid materials and adjusting to about pH 2 or lower the mixture may be absorbed on a strong cation exchange resin, such as sulfonic acid resin, Amberlite IR–120 (hydrogen cycle) (Rohm & Haas Co.), followed by elution with dilute ammonium hydroxide. The eluate is passed through a weak cation exchange resin such as carboxylic acid resin, Amberlite IRC–50 (hydrogen cycle) (Rohm & Haas Co.). Glutamic acid is then absorbed on a weak anion exchange resin such as the amine resin, Amberlite IR–4B (Rohm & Haas Co.) and diaminopimelic acid obtained from the effluent by concentration. Glutamic acid is eluted with dilute ammonium hydroxide and obtained by concentration of the effluent. The acids may be further purified by the standard method of recrystallization.

Alternatively, diaminopimelic acid need not be recovered from the fermentation medium, but may be converted to lysine, in situ. The conversion may be carried out employing the method of Casida, U.S. Patent 2,771,-396, wherein is described the decarboxylation of diaminopimelic acid to lysine by the enzyme systems of the organisms, *E. coli* and *A. aerogenes*. The organism is added to the fermentation medium and cell walls ruptured by toluene to release the enzyme systems required for the decarboxylation reaction. After the decarboxylation is complete, the mixture of lysine and glutamic acid is then recovered from the fermentation mixture by filtering off the solid materials, passing the filtrate through a strong cation exchange resin such as the sulfonic acid resin, Amberlite IR–120 (Rohm & Haas Co.) which absorbs both the lysine and glutamic acid. Both amino acids are eluted from the resin by dilute ammonium hydroxide and the eluate freed of ammonia by concentration. The mixtures may be used in animal feed compositions as such or may be further separated by standard procedures well known in the art. One such method is absorbing lysine on a weak cation exchange resin such as carboxylic acid resin, Amberlite IRC–50. Glutamic acid is obtained from the effluent by evaporation. The lysine is eluted from the resin with dilute hydrochloric acid and crystallized as the hydrochloride after concentration. Further purification of the amino acids may be effected by the standard method of recrystallization.

The following examples are given by way of illustration and are not to be construed as limitations of this invention, many variations of which are possible within the scope and spirit thereof.

*Example I*

*E. coli*, ATCC 12,932, was rinsed from an agar slant under sterile conditions into one liter of the following inoculum medium in a Fernbach flask which had previously been sterilized by autoclaving for 30 minutes at 20 pounds/square inch pressure.

| | G/l. |
|---|---|
| MgSO₄.7H₂O | 0.2 |
| Citric acid monohydrate | 2.0 |
| K₂HPO₄ | 10.0 |
| NaNH₄HPO₄ | 3.5 |
| Glucose monohydrate (sterilize separately) | 10.0 |
| Lysine hydrochloride | 0.7 |

Adjust to pH 7.2 with ammonium hydroxide.

The organism was grown for 20 hours at 28° C. with shaking. A fermenter medium was prepared for the actual preparation of diaminopimelic acid and glutamic acid. The medium had the following composition:

| | G/l. |
|---|---|
| Glycerol | 20 |
| Crude beet molasses | 40 |
| (NH₄)₂HPO₄ | 20 |
| Cornsteep liquor | 40 |
| MgSO₄.7H₂O | 0.5 |

Two liters of this medium were autoclaved for ½ hour at 20 pounds/square inch pressure. Fifty milliliters of the inoculum was added to the 2 liters of the fermenter medium. The reaction was carried out at 28° C. with stirring at a rate of 1750 revolutions/minute and aeration at a rate of one volume of air per volume of reaction mixture per minute. After 45 hours, the reaction mixture assayed as having a diaminopimelic acid content of 6 grams/liter and a glutamic acid content of 6 grams per liter. *A. aerogenes*, cultivated by the method of Casida (op. cit.) was then added to the fermentation broth and the pH of the broth adjusted to 8.0 with ammonium hydroxide. Toluene of a volume equal to 2% of the broth was admixed. The mixture was allowed to stand for 40 hours more at the end of which time, the diaminopimelic acid had been converted to lysine in 100% yield. The fermentation broth was then filtered and the filtrate adjusted to pH 2 with hydrochloric acid. It was then passed over Amberlite IR-120 which absorbed lysine and glutamic acid. Both acids were eluted by treatment with a dilute solution of ammonium hydroxide, and the eluate evaporated to drive off the ammonia. The resultant solution was passed through carboxylic acid resin, Amberlite IRC-50 (Rohm & Haas Co.) and the lysine absorbed. The effluent was evaporated to obtain the glutamic acid. The lysine was obtained by eluting with dilute ammonium hydroxide. The eluate was freed of ammonia by heating and acidified to pH 5 with dilute hydrochloric acid. The lysine crystallized as the hydrochloride after concentration.

*Example II*

The procedure of Example I was used employing the following fermenter medium:

| | G/l. |
|---|---|
| Crude beet molasses | 50 |
| Sucrose | 20 |
| (NH₄)₂HPO₄ | 20 |
| MgSO₄.7H₂O | 0.5 |
| Lysine hydrochloride | 0.2 |

Adjust to pH 7.8 with NH₄OH.

The reaction mixture after 45 hours assayed as having a diaminopimelic acid content of 6 grams/liter and a glutamic acid content of 8 grams/liter. The acids were separated by ion exchange treatment. After filtration of the fermentation medium and adjustment to pH 2, the acids were absorbed on Amberlite IR-120, eluted with ammonium hydroxide, and the eluate freed of ammonia by passing through carboxylic acid resin, Amberlite IRC-50 (Rohm & Haas Co.). Glutamic acid was then absorbed on weakly basic resin, Amberlite IR-4B and diaminopimelic acid recovered from the effluent by evaporation. Glutamic acid was eluted with dilute ammonium hydroxide and obtained by evaporation.

What is claimed is:

1. A process for the preparation of a mixture of diaminopimelic acid and glutamic acid which comprises fermenting under submerged, aerobic conditions, *E. coli*, ATCC 12,932 in a nutrient medium initially containing from about 0.1 to about 0.5 gram of L-lysine per liter.

2. A process for the preparation of a mixture of lysine and glutamic acid which comprises the steps: (*a*) fermenting under submerged, aerobic conditions *E. coli*, ATCC 12,932 in a nutrient medium initially containing from about 0.1 to about 0.5 gram of L-lysine per liter and (*b*) contacting the medium with the enzyme systems of a diaminopimelic acid decarboxylase-producing organism.

References Cited in the file of this patent

UNITED STATES PATENTS

| 2,771,396 | Casida | Nov. 20, 1956 |
| 2,841,532 | Kita et al. | July 1, 1958 |

OTHER REFERENCES

Advances in Enzymology, vol. 6, pp. 7 and 8 (1946), Interscience Publishers Inc., New York.

Advances in Enzymology, vol. 16, pp. 297–299 (1955), Interscience Publishers Inc., New York.

Advances in Enzymology, vol. 17, pp. 403–405 (1956), Interscience Publishers Inc., New York.

Biochemistry of Amino Acids, by Meister, Academic Press Inc., New York, (1957), page 361.